United States Patent [19]

Sander

[11] Patent Number: 5,537,248
[45] Date of Patent: Jul. 16, 1996

[54] ACCESSORY MODULE FOR A STEREO MICROSCOPE

[75] Inventor: Ulrich Sander, Oberkochen, Germany

[73] Assignee: Carl-Zeiss-Stiftung, Heidenheim, Germany

[21] Appl. No.: 223,333

[22] Filed: Apr. 5, 1994

[30] Foreign Application Priority Data

Apr. 10, 1993 [DE] Germany ............................ 93 05 447.5

[51] Int. Cl.⁶ .................................................. G02B 21/22
[52] U.S. Cl. .......................... 359/376; 359/377; 359/378
[58] Field of Search ..................................... 359/375–378, 359/462, 471, 475, 480, 482, 837, 831, 833, 834, 835

[56] References Cited

U.S. PATENT DOCUMENTS

| | | | |
|---|---|---|---|
| 4,674,845 | 6/1987 | Matsumura | 359/377 |
| 4,838,671 | 6/1989 | Papritz et al. | 359/377 |

FOREIGN PATENT DOCUMENTS 928205  6/1963  United Kingdom.

*Primary Examiner*—James Phan

[57] ABSTRACT

In an insertable accessory module for a stereo microscope, in particular an operation microscope, two optical elements are pivotably arranged in the parallel observation beam paths after the main objective. A continuous variation of the stereo angle is possible by pivoting about two pivot shafts that are oriented perpendicular to the observation beam paths.

10 Claims, 2 Drawing Sheets

ACCESSORY MODULE FOR A STEREO MICROSCOPE

BACKGROUND OF THE INVENTION

1. Field of the Invention

The present invention relates to an accessory module for a stereo microscope.

2. Relevant Prior Art

A series of possibilities exists for varying the stereo angle between the two observation beam paths in a stereo microscope. Thus it is known from German Utility Model G 1,827,188 of the Applicant's employer to pivotably arrange two planar plates between the main objective and a device for changing the magnification. The two planar plates are pivotable around the optical axes of the stereoscopic observation beam paths, so that a variation of the stereo base is made possible by means of a suitable operating element. In this apparatus, on pivoting the planar plates, the observation beam paths no longer pass symmetrically through the main objective in intermediate positions; moreover, the plane which is defined by the two stereoscopic beam paths moves perpendicularly to the main objective. As a result, the observer's perspective changes when the stereo angle is varied. Furthermore, when the stereoscopic beam paths pass through edge regions of the main objective, a deteriorated image quality occurs because the optical correction is not optimal in these edge regions.

A further possibility for varying the stereo base is known from U.S. Pat. No. 4,838,671 (European Patent EP 242,321). A suitable prism, which consists of two plane-parallel plates including between them a defined angle, is fixedly arranged on a common rotor. Its axis of rotation is oriented perpendicular to the observation beam paths, or this axis lies in a plane which is spanned by the two observation beam paths. A total of three different stereo angles results, according to the pivoted position of the rotor of the prism, between the two observation beam paths, i.e. the possibility of varying the stereo angle is limited to three discrete stereo angles.

SUMMARY OF THE INVENTION

The object of the present invention is to provide for a stereo microscope an accessory module that makes possible a continuous variation of the stereo angle between the two stereoscopic observation beam paths, and which eliminates the disadvantages of the state of the art.

This object is achieved by an accessory module, for a stereo microscope in which optical elements are moveable around two pivot shafts for varying the stereo angle between two observation beam paths. The optical elements have mutually parallel entry and exit faces, and the pivot shafts have pivot axes oriented perpendicular to the observation beam paths to enable continuous variation of the stereo angle.

The accessory module according to the invention is particularly suitable for an operation microscope in eye operations, where an improved perception of the so-called red reflection is now possible due to the continuously variable stereo base or the continuously variable stereo angle. To optimize the red reflection, the stereo angle can be suited individually to the respective observed eye of the patient and its geometry.

Furthermore, the accessory module according to the invention has a simple adjusting mechanism that makes possible the synchronized pivoting of the two optical elements for variation of the stereo angle without great expenditure.

It is furthermore advantageous that conventional operation microscopes can now, in combination with the accessory module according to the invention, be used for eye surgery.

BRIEF DESCRIPTION OF THE DRAWINGS

Further advantages and details of the accessory module according to the invention will become apparent from the following description of a preferred embodiment taken together with the accompanying Figures, in which.

DETAILED DESCRIPTION OF A PREFERRED EMBODIMENT

Figure 1A:
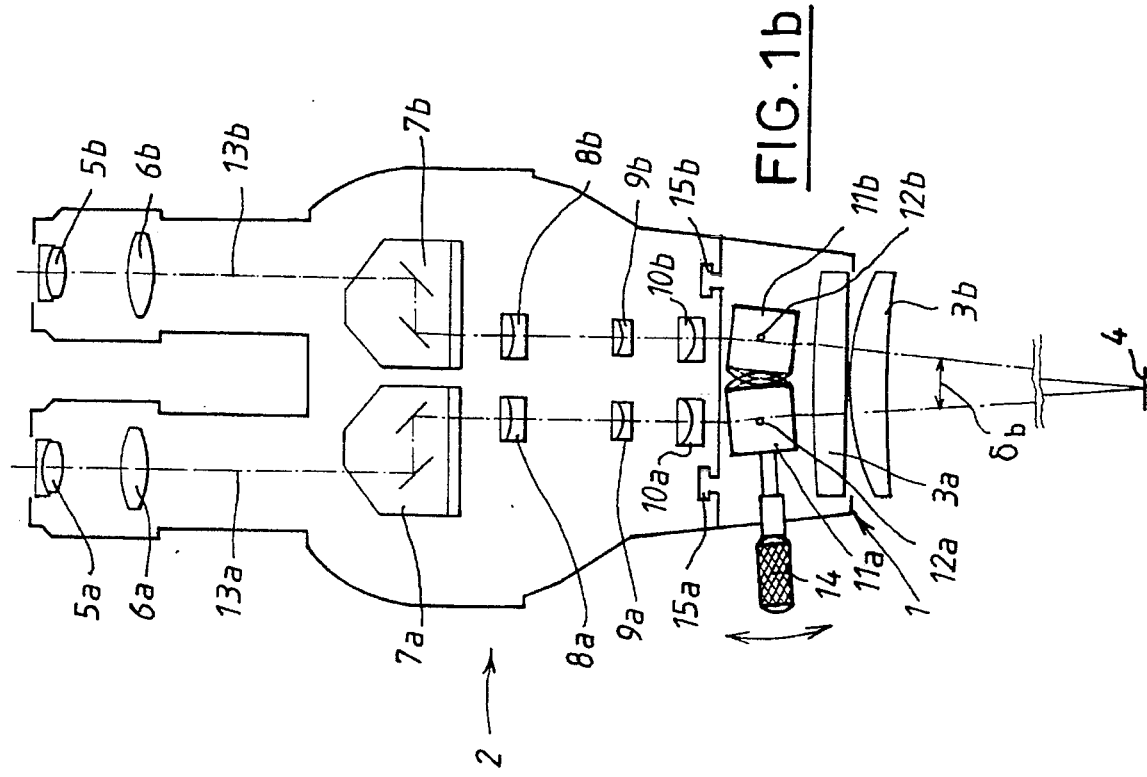
FIGS. 1a and 1b respectively show a schematic representation of a stereo microscope including the accessory module, different stereo angles between the two observation beam paths being realized.
Figure 1B:
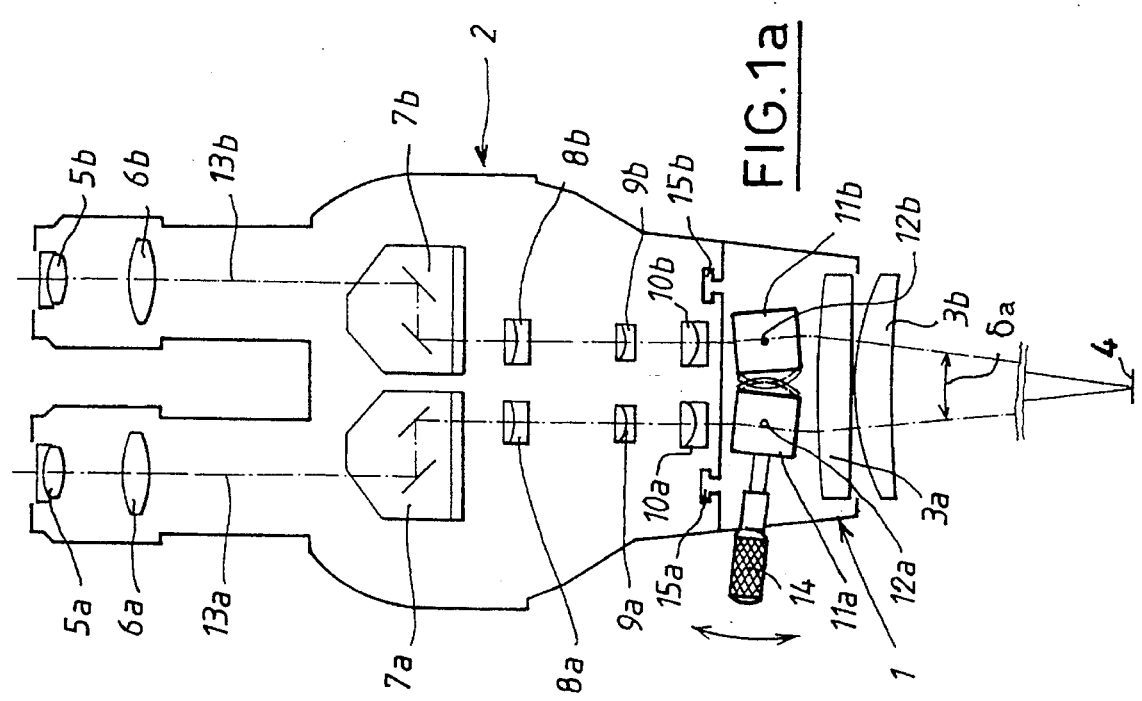

An operation microscope (2) is schematically shown in front view in FIGS. 1a and 1b, as a stereo microscope. The accessory module (1) according to the invention is arranged beneath the device for changing the magnification (8a, 9a, 10a; 8b, 9b, 10b). In the two illustrations, respectively different stereo angles δa and δb are brought about between the two observation beam paths.

The operation microscope (2) illustrated has a construction that is known per se and includes a main objective (3a, 3b) arranged in the accessory module and consisting of two separate lenses. The accessory module according to the invention furthermore makes possible a rapid change of the main objective (3a, 3b), in case other main objective focal intercepts should be required. The accessory module can thus be variably used even with objectives of very different focal intercepts. Furthermore, the operation microscope (2) includes a devise (8a, 9a, 10a; 8b, 9b, 10b) consisting of several individual optical elements, for changing the magnification: for example, a known Galilean magnification changing device. Alternatively, it is possible at any time to use a device for a continuously varying change of magnification. The device (8a, 9a, 10a; 8b, 9b, 10b) for changing magnification is followed in succession, in the two stereoscopic observation beam paths, by image rectifying prisms (7a, 7b) and tube lenses and eyepiece lenses (5a, 6a; 5b, 6b). Furthermore, the operation microscope has an illuminating device (not shown), with at least one light source and one or more deflecting elements.

The accessory module (1) according to the invention contains, in addition to the interchangeable main objectives (3a, 3b), two pivotable optical elements (11a, 11b). The pivotable optical elements (11a, 11b) are arranged in the parallel beam paths between the main objective (3a, 3b) and the device (8a, 9a, 10a; 8b, 9b, 10b) for changing the magnification. Furthermore, there is arranged in the accessory module at least one deflecting element, with which the illumination beam path is deflected in the direction of the operation field. For the sake of clarity, the deflecting element is not shown in FIGS. 1a and 1b.

It goes without saying that the accessory module according to the invention can also be installed in a simpler operation microscope that has no device for changing the magnification. The arrangement of the optical elements for varying the stereo angle takes place analogously in the parallel beam paths after the main objective.

The two pivot shafts (12a, 12b) of the optical elements (11a, 11b) in the accessory module are oriented perpendicularly to the observation beam paths and also perpendicularly to the plane spanned by the observation beam paths. In the illustrations of FIGS. 1a and 1b, the respective optical axes (13a, 13b) of the two stereoscopic observation beam paths are shown. The two optical elements (11a, 11b) are continuously movable around the pivot shafts (12a, 12b) by means of an operating element (14). For this purpose, one of the two pivot shafts (12a) is connected to the operating element (14). The tilting or pivoting of the two optical elements (11a, 11b) takes place in synchronism, i.e. the two optical elements (11a, 11b) are respectively tilted by the same angular amount with respect to the optical axis (13a, 13b) of the respective observation beam path. The two extreme positions of the optical elements (11a, 11b) are shown in the illustrations of FIGS. 1a and 1b, and can be assumed by these elements to vary the stereo angle between the largest (δa) and the smallest (δb) stereo angle. Between these positions, a continuous change of the stereo angle is possible, or a continuous variation of the stereo base.

In addition to the possibility of actuating the operating element (14) manually, as in the illustrated embodiment, it is possible according to the invention to actuate the operating element by means of a motor drive. This can be advantageous, according to the circumstances, when the defined setting of a desired stereo angle is required. The operating element can then be moved by the motor drive, by means of a reference table recorded digitally in a control unit, into that position which corresponds to the desired, associated stereo angle. Such a motor setting of the stereo angle can be provided by means of a control circuit or adjusting circuit realized in software. In this kind of embodiment of the accessory module according to the invention, angle encoders can be provided in connection with the motor drive and can monitor the actual angular position of the operating element at any given time, and thus also the actual stereo angle, and make it accessible by a central control unit.

The accessory module (1) according to the invention is displaceably attached by means of guides (15a, 15b) to the operation microscope, so that in principle even a conventional operation microscope can be used for eye operations.

Two prism cubes serve in the illustrated embodiment as the optical elements (11a, 11b) for varying the stereo angle; their faces through which pass the respective beam paths are oriented mutually parallel.

Figure 2:
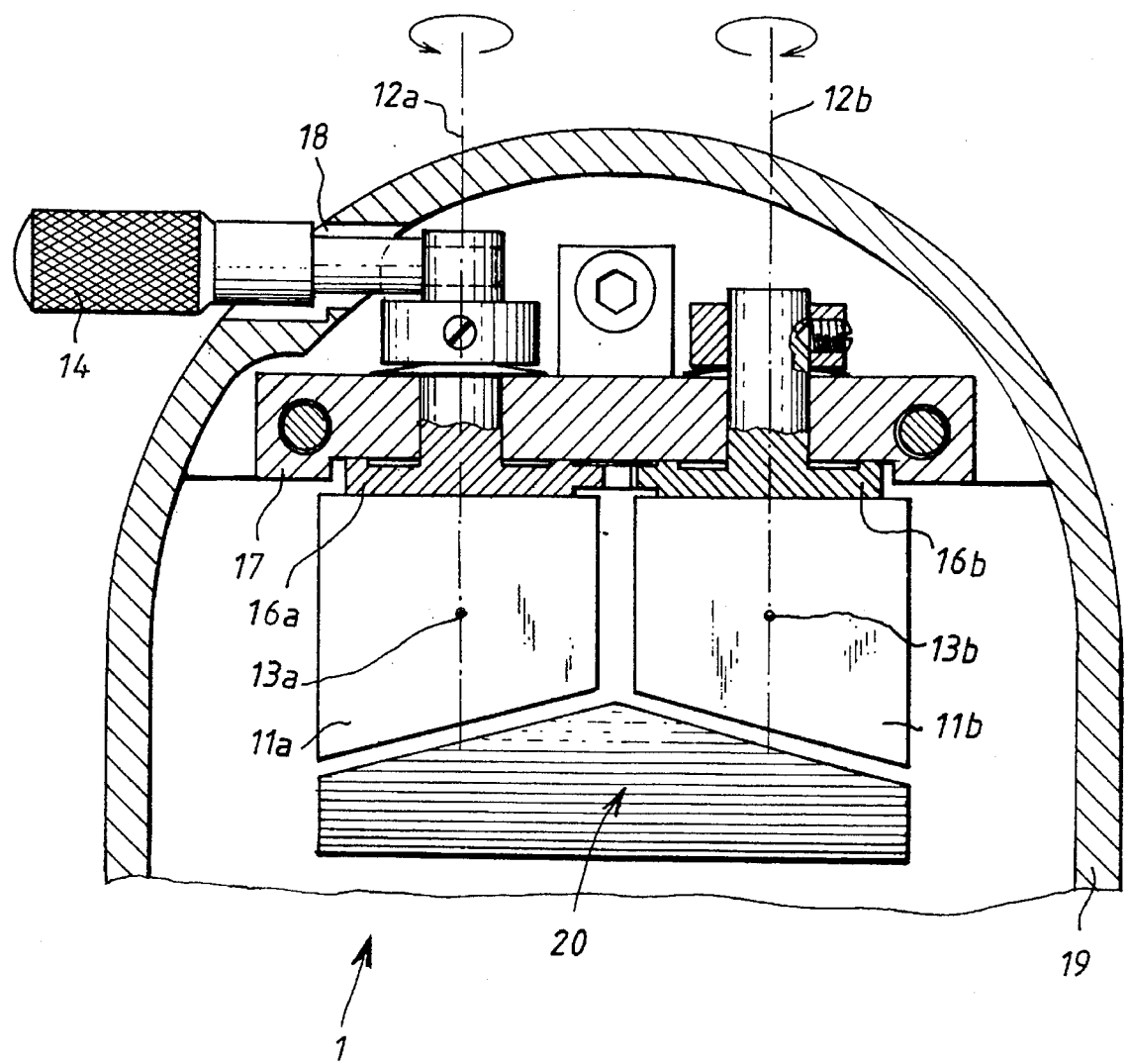
FIG. 2 shows a partial plan view of a preferred embodiment.

A plan view is shown in FIG. 2. The same reference numbers are used for the same parts as used in FIGS. 1a and 1b. The prism cubes (11a, 11b) are mounted to pivot about the pivot shafts (12a, 12b), on a mounting element (17) within the accessory module (1). One of the two pivot shafts (12a) is rigidly connected to the operating element (14), which is brought out through a recess (18) in the housing (19) of the accessory module (1) and is accessible to the user. The synchronized tilting of the two prism cubes (11a, 11b) is effected by two gear wheels (16a, 16b) arranged on the pivot shafts (12a, 12b) between the mounting element (17) and the respective prism cube (11a, 11b). These gear wheels at least partially interengage, so that a corresponding synchronized tilting of the other prism cube (11b) takes place when one prism cube (11a) is tilted.

Markings are advantageously applied to the housing (19) of the accessory module in the neighborhood of the recess (18) through which the operating element (14) is brought out, and indicate to the user which position of the operating element (14) corresponds to which stereo angle of the observation beam paths.

A deflecting element (20) arranged in the accessory module can also be seen in the illustration of FIG. 2; by means of which the illuminating beam path is deflected into the direction of the operation field. The sides of the prism cubes that are oriented in the direction of the deflecting element (20), and also the shape of the deflecting element (20), are dimensioned and positioned such that at least a partial overlapping of the observation beam paths and illumination beam path results.

I claim:

1. Accessory module for a stereo microscope having a stereo angle between two observation beam paths, comprising a plurality of optical elements tiltable about two pivot axes out of a position in which said stereo angle has a first defined value, means for continuously increasing and decreasing said stereo angle from said first defined value to other stereo angle values, said other stereo angle values being dependent upon tilting angle and tilting direction of said optical elements, wherein said optical elements have mutually parallel entry and exit faces, said two pivot axes are oriented perpendicular to said observation beam paths, and variation of said stereo angle is only caused by refraction of said observation beam paths at said entry and exit faces without reflection within said optical elements.

2. Accessory module according to claim 1, wherein said optical elements are continuously pivotable between two discrete positions, said discrete positions corresponding to the greatest and smallest stereo angle that can be set.

3. Accessory module according to claim 1, wherein two prism cubes are provided as said optical elements, and are each movable around a respective one of said two pivot shafts.

4. Accessory module according to claim 1, further comprising an operating element rigidly connected to at least one of said two pivot shafts.

5. Accessory module according to claim 4, further comprising at least one gear wheel centered with respect to each of said two pivot shafts respectively, and arranged to interengage with said respective gear wheel on the other of said two pivot shafts.

6. Accessory module according to claim 1, further comprising a main objective arranged beneath said optical elements.

7. Accessory module according to claim 6 further comprising at least one deflecting element for deflecting an illuminating beam path of an illuminating device arranged in said accessory module for providing at least partial overlapping of said observation beam paths and said illumination beam path.

8. Accessory module according to claim 1, wherein said optical elements are arranged between a main objective and a device for changing magnification, in a region in which the optical axes of said observation beam paths are oriented mutually parallel.

9. Accessory module according to claim 1, further comprising arranging means for insertably arranging said optical elements on said stereo microscope.

10. A stereo microscope having an integrated accessory module according to claim 1.

* * * * *